W. KLINE.
TIRE CORDING MACHINE.
APPLICATION FILED NOV. 6, 1916.
1,259,997.
Patented Mar. 19, 1918.
3 SHEETS—SHEET 2.
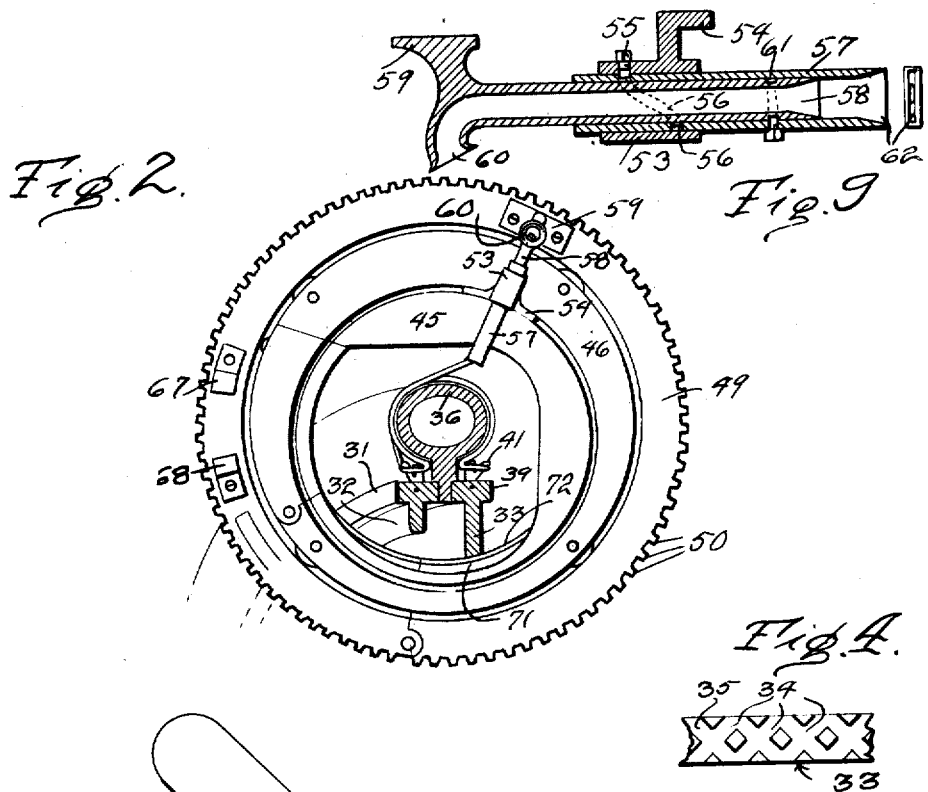
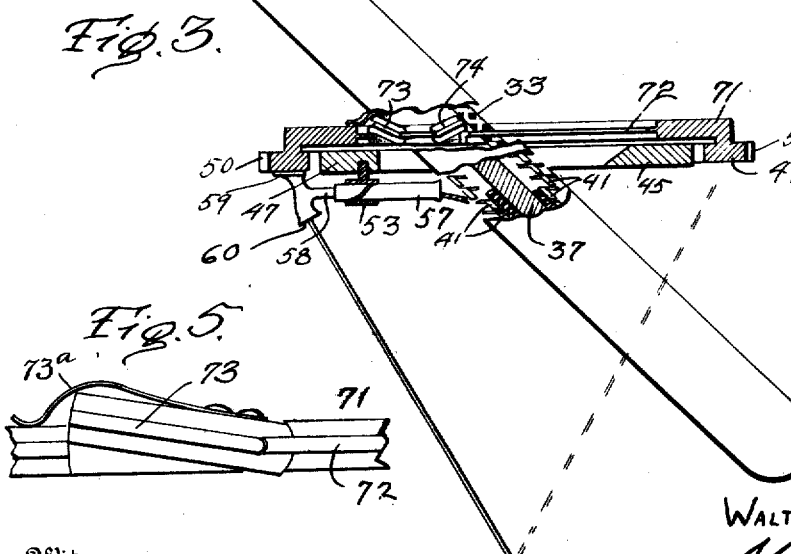
Inventor
WALTER KLINE
Witness
Oscar V. Payne
By Knight Bros
Attorney

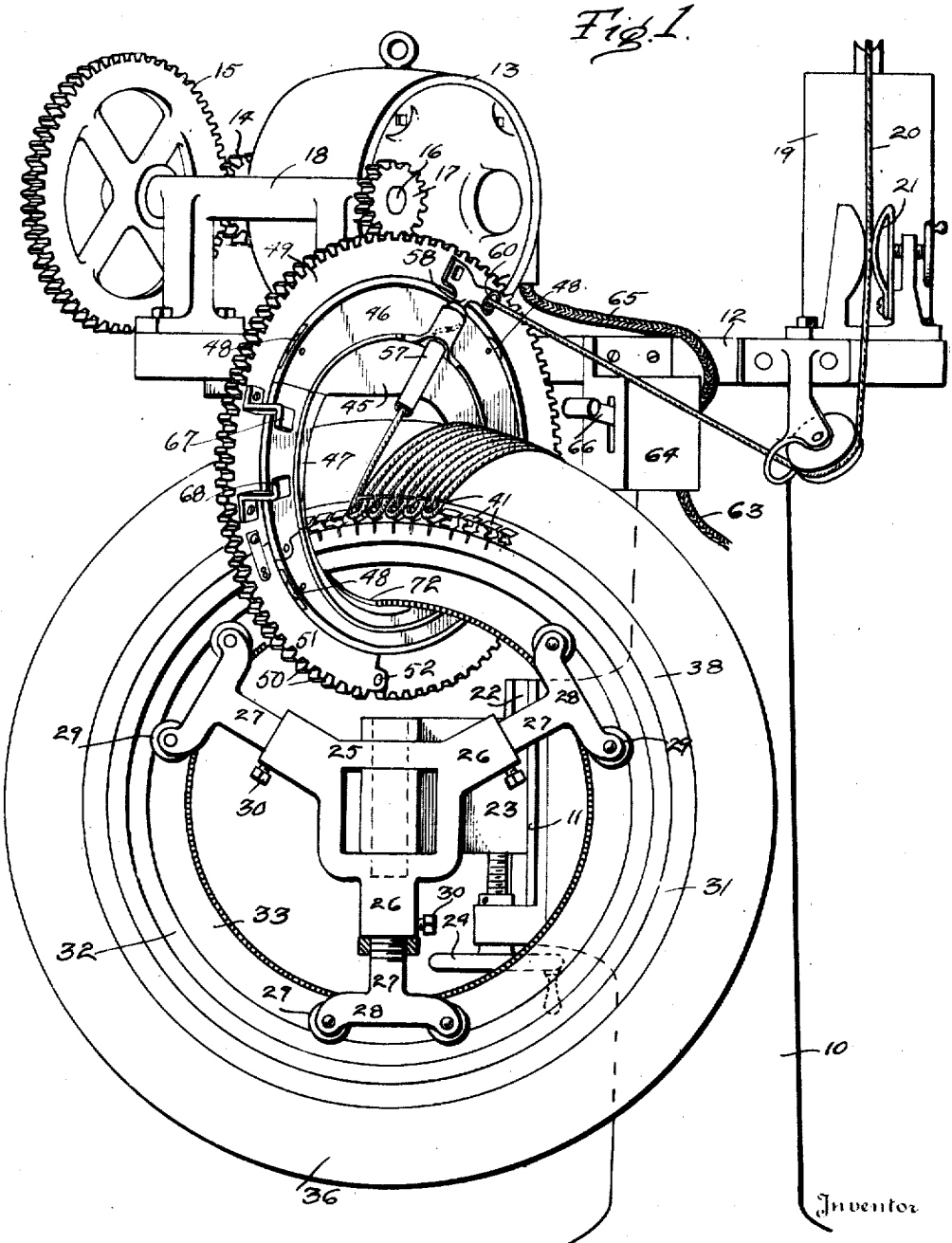

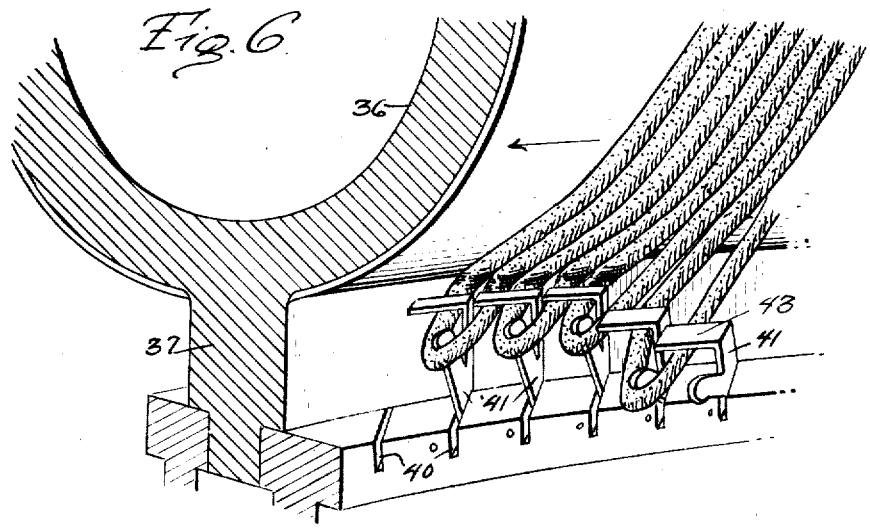
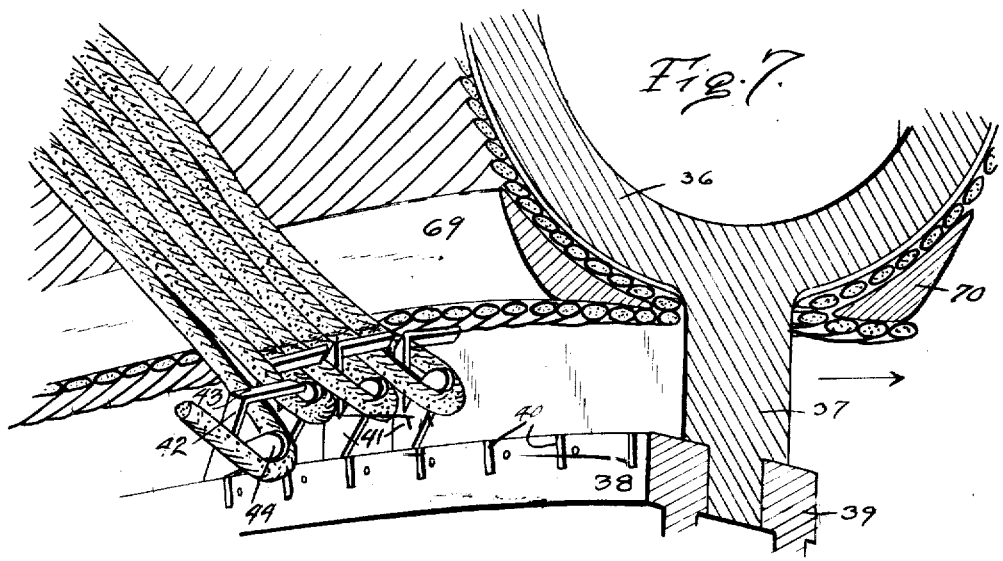
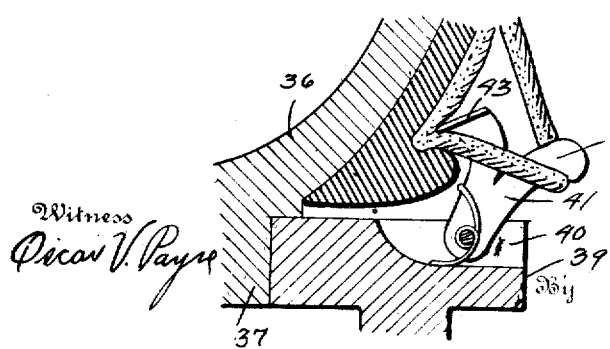

UNITED STATES PATENT OFFICE.

WALTER KLINE, OF LAKE, OHIO.

TIRE-CORDING MACHINE.

1,259,997. Specification of Letters Patent. Patented Mar. 19, 1918.

Application filed November 6, 1916. Serial No. 129,834.

*To all whom it may concern:*

Be it known that I, WALTER KLINE, a citizen of the United States, residing at Lake, in the county of Stark and State of Ohio, have invented certain new and useful Improvements in Tire-Cording Machines, of which the following is a specification.

This invention relates to tire cording machines, and one of the objects is to provide means whereby the cords or strands will be laid across the inner wall of the tire in an expeditious and efficient manner.

By the term "cording," I wish it understood that I contemplate the inclusion of cords, tapes, strands, and particularly strips of flat material.

In applying the flat strips, I provide means for arranging the same upon edge adjacent to the bead or anchor portion of the tire, and gradually turn the flat cord or strip so that it lies flat against the inner wall of the tire near the tread. I also provide means for arranging the strands in reverse diagonal relation or zig-zag so that the strands of one layer will overlap the strands of an adjacent layer.

I also contemplate the inclusion of means for folding the ends of the strands, that is the inner layer, against the inner wall of the tire in position to receive the anchor rings or beads, the said mechanism being effective for laying the ends of the outer layer on the outside of the anchor ring or bead.

Other objects and advantages of the invention will be apparent by reference to the accompanying drawings when taken in connection with the description, it being understood that changes in form, proportion, and minor details of construction may be made without departing from the spirit of the invention or sacrificing any of its advantages.

In the drawings:—

Figure 1 is a perspective view of a tire cording machine constructed in accordance with my invention;

Fig. 2 is an elevational view of the cord applier, the tire and its support being shown in section;

Fig. 3 is a sectional view through the cord applier and its support, the former ring shifter being shown in elevation;

Fig. 4 is a fragmentary view of the inner edge of the former carrying ring;

Fig. 5 is a fragmentary view of the former carrying ring shifter;

Fig. 6 is a fragmentary view of the tire former, showing the inner wall of the tire and a plurality of loops of the inner layer of cord;

Fig. 7 is a fragmentary view of the tire former, showing the anchor beads positioned upon the inner layer of cord, and a plurality of loops of the outer layer of cord ready to be applied;

Fig. 8 is a detail view of one of the cord-positioning cleats, and

Fig. 9 is a sectional view through the cord twister.

Referring now to the drawings by numerals of reference, 10 designates a standard having a vertically grooved bracket 11 intermediate its ends and carrying at its upper end a table 12, on which is a motor 13. The motor 13 is provided with a pinion 14, meshing with a gear 15 on one end of a shaft 16 which carries a pinion 17, said shaft 16 being journaled in a bearing 18 on the table 12. The gears 14, 15 and 17 constitute a back gearing to reduce the speed imparted to the ring of an oscillating cord applier, as will be apparent hereinafter. The table 12 also supports a receptacle 19 containing the cord or strand 20 to be applied to the tire, and this cord or strand may pass through a tension device 21, if desired, which is shown supported upon the table 12 in Fig. 1.

Vertically adjustable in the groove 22 of the bracket 11 is a supporting block 23 having movement imparted thereto through the medium of the jack-screw 24. The block 23 carries a pivoted spider head 25, having radial tubular portions 26 receiving the ends 27 of the T-shaped ring guides 28, each of which may be provided with anti-friction rollers 29. The ends 27 are adjustable within the sockets 26 and they may be held in adjusted position by means of the screws 30.

The support consisting of the head 25 and the radial members 28 carries a former ring 31 having an inwardly projecting flange 32 to one side of the longitudinal center thereof, and which is engaged by the concave portions of the rollers 29, whereby the ring is free to rotate about the rollers. Near the opposite side edge of the ring 31 is an inwardly projecting flange 33, substantially parallel with the flange 32, but of greater depth and provided with intersecting grooves 34 and 35, arranged in diagonal relation to receive the former shifter, as will be explained hereinafter. The ring carries on its periphery a tubular former head 36, connected to said ring by the web 37, it being understood that the head is in the form of a circumferential tube, the outer contour of which will be substantially the same as the inner contour of the tire casing to be formed. Along the outer edges 38 and 39 of the ring 31 are notches 40, in which are pivoted the cord-end positioning cleats 41 adapted to be normally retracted by the springs 41ᵃ but which are movable toward the grooves (Fig. 8) near the free edges of the tire. Each cleat is shown as consisting of an upwardly projecting finger 42 having a right angular extension 43 thereon at its upper end, and an outwardly projecting tensioning finger 44 extending from the base or near the pivotal point of the cleat. The number of cleats will correspond to the number of loops included in one layer, for after the cords are positioned in one layer upon the inner wall of the tire, the ends are cut and the cleats may be utilized for the loops of the next succeeding layer of cord.

By reference to Fig. 1, it will be observed that the cord laying mechanism is supported upon a bracekt 45 consisting of the ring 46 and supported by the table 12. The ring is provided with a hinged segment or gate 47, whereby the ring may be opened to receive the former and its support, and whereby the former may be removed when desired. The ring 46 is provided with anti-friction bearings 48 in its periphery to receive the geared ring 49 of the cord-laying mechanism. The ring 49 is rotatable about the ring 46 and has peripheral teeth 50, which mesh with the pinoin 17, so that when the motor 13 rotates, motion will be imparted to the ring 49, but at a reduced speed. The ring 49 is also provided with a hinged segment 51, which may be swung on its hinge 52 to permit the introduction and removal of the former ring with respect to the opening in ring 46. The ring 49 supports the cord twisting device which is best shown in Fig. 9 as consisting of a bracket 53 having a guide lug 54 engaging the inner edge of ring 46, and as the inner edge of the ring 46 is eccentric for a portion of its length, a slight reciprocatory motion may be imparted thereto as it rides over the inner edge of said ring. The bracket 53 carries a stud 55, which engages in a cam groove 56 in the sleeve 57 interposed between said bracket, and the inner guide tube 58 which is fast on the ring 49, as shown at 59, and which is provided with a receiving opening 60. The tubes 57 and 58 are held against relative longitudinal movement by an interlocking ring 61, although said tubes may have relative rotating movement, one with respect to the other. The tube 58 terminates short of the lower end of the tube 57, and as the latter tube is provided with an outlet opening 62, substantially rectangular in cross section, it follows that any rotative movement imparted to the tube 57 will result in twisting the cord or strand 20, which is fed therethrough. As heretofore explained, it is desirable to impart an oscillatory movement to the ring 49 and in order to accomplish this, it will be necessary to automatically reverse the motor 13. This may be accomplished in the following manner.

The motor 13 is supplied with current from a suitable source through the conductor 63 leading into a reversing-switch box 64, from which a conductor 65 leads. Projecting through the switch box 64 is a switch handle 66, adapted to be shifted in one position through the medium of the actuating finger 67 on the gear 49 and adapted to be shifted in an opposite position through the medium of the actuating finger 68 also carried by the gear 49. When the motor is started to impart motion to the gear 49 in one direction, the gear 49 will continue to rotate until one of the fingers 67 or 68 contacts with the switch handle 66. Then the switch will be reversed, causing the motor to reverse. As a consequence, the gear 49 will be shifted in a reverse direction until the other operating finger comes in contact with the switch handle, causing the motor to turn in an opposite direction. Thus it will be seen that the gear 49 may be automatically and alternately rotated in opposite directions.

During each full movement of the ring 49 in one direction, a cord is laid entirely across the tire and under the finger 43 of one of the cleats 42. It is desirable that upon the return movement of the cord, the end of the previously laid strand will be positioned in close contact with the inner wall of the tube, or in intimate contact with one of the anchoring beads 69 and 70, as the case may be. It is also desirable that each time a strand is laid across the tire, or across the inner wall thereof, that the former be shifted substantially the width of one of the strands, and that the cord or strand pass over the finger 44 to put a slight tension upon the end of the strand and move it into intimate contact with the inner wall of the tire or the bead. This is accomplished in the following manner: The gear 49 is provided with a flange 71 which overlaps the side of the ring 46 and which carries a guide rib 72 interrupted by the spring-actuated tongues 73 and 74 against which the springs 73ᵃ press, one for each tongue, which are in line and of substantially the same thickness as the guide rib 72, as is best shown in Fig. 3. By reference to Fig. 8 it will be observed that the springs 41ᵃ will have a tendency to move the cleats away from the former but the springs will be opposed by the tension of the cords. The guide rib will engage one of the grooves 34 or 35 as the ring 49 is rotated a distance sufficient to lay the cord entirely across the tire, and the movement of the ring will be sufficient to permit the then effective tongue to initially slip through the groove between the teeth then being engaged. As soon as the tongue slips through the groove, the spring will be effective in deflecting the tongue the width of one tooth, or into the next succeeding space. Upon reversal then of the ring 49, the pressure exerted against the side of the groove in guiding the rib through the groove will be effective in shifting the former ring in a rotative direction to the extent of the width of one groove, so that as the ring 49 continues its reverse movement, the cord will be laid upon the previously laid cord, and by exerting a slight tension upon the finger 44, the right angular projection 43 will force the loop just made into intimate contact with the tire and into the grooves. After all of the loops are laid for the first layer, the anchor beads 69 and 70 may be put in place, the ends of the cord cut, the spider head 25 swung on its pivot, so as to tilt the former ring in a diagonal direction opposite to that assumed by the ring in a previous operation, and the laying of the cords in an opposite diagonal relation may be proceeded with.

I find it desirable to impart the twisting movement to the cords, particularly if they are flat, so that near the ends of the cords, they will lie on edge where there is a lesser diameter, and so that they will lie flat near the tread where the diameter is greater.

From the foregoing description, it is obvious that I have provided a tire cording machine which is simple in construction, efficient in operation, and which will insure the proper disposition of the cords on the tire, and that I have so arranged the various mechanisms that the machine may be operated with a maximum efficiency and minimum loss of time and expenditure of labor.

I claim:—

1. In a tire cording machine, a circular former, an oscillating ring-shaped cord-laying device through which the former projects, cord-engaging means on opposite sides of the former, and a cord-twisting device carried by the cord-laying device.

2. A tire cording machine comprising a former, a ring-shaped cord-laying device through which the former projects, pivoted means for engaging the cord on opposite sides of the former, and responsive to tension of the cord to clamp the engaged cord against the tire and means operated by the cord-laying device for intermittently feeding the former through the ring.

3. In a tire cording machine, a circular former, a vertically adjustable support for said former, an oscillatory ring-shaped cord-laying device through which the former projects, a tubular cord-twisting device carried by the cord-laying device, and means on opposite sides of the former for engaging the cord.

4. In a tire cording machine, a former, a pivoted support for said former, an interior flange for said former having grooves, a cord-laying device for said former, means operated by the cord-laying device and having a back-and-forth movement crosswise of the former for intermittently engaging the grooves to progressively feed the former with respect to the cord-laying device, and means on opposite sides of the former for engaging the cord.

5. In a tire cording machine, a former having swinging positioning cleats thereon, said cleats being normally retracted away from the former, means for feeding a cord back and forth over the former to engage the cleats, and means for applying tension to the cord to move the cleats in an inward direction while in engagement with the cord.

6. In a tire cording machine, a ring-shaped former, means for applying cord back and forth over said former, an annular row of positioning cleats responsive to the tension of the cords for forcing the ends of the cords against the sides of the former, and means for twisting said cords.

7. In a tire cording machine, a former having notches in its inner periphery, means for laying cord back and forth over said former, and means movable across the former and actuated by the first-named means for intermittently and progressively feeding said former past the applied cord.

8. A tire cording machine comprising a former having a circumferential forming head, pivoted cleats on said former adjacent to said head and having cord-positioning fingers, cord-engaging fingers carried by said cleats, and means for feeding cord over said former and around said cleats.

9. In a tire cording machine, a former, means for feeding cord over said former comprising an oscillating ring, a rigid support therefor, the inner edge of which is eccentric to the axis of the ring, a cord-turning device connected to the ring and comprising a tube rigid on the ring, an outer tube rotatable upon the first tube, and means engaging the outer tube and bearing against the eccentric edge of the rigid support to effect a turning movement of the outer tube when the ring is rotated.

10. A tire cording machine comprising a former, pivoted cleats on said former and having cord positioning fingers, cord engaging fingers carried by said cleats, means for feeding cord over the former and around the cleats, said means comprising an oscillating ring about said former, means for driving said ring, and means carried by the ring for reversing the driving means.

11. In a tire cording machine, a former, a swinging bracket for said former, a flange on the inner periphery of said former and having intersecting, inclined grooves in the edge thereof, a ring-shaped cord-feeding mechanism through which the former projects, means on the former for engaging the cords, and means carried by the cord-laying mechanism for intermittently engaging and releasing the inclined grooves to feed the former with respect to the cord-laying mechanism.

12. In a tire cording machine, a standard, a vertically adjustable former support carried by said standard, a former holder pivoted on said support, a former carried by the holder and rotatable about the same, a ring-shaped cord-laying device through which the former projects, means for oscillating said ring-shaped cord-laying device, means on the former for engaging the cords, and means carried by the cord-laying device for intermittently feeding the former about its holder.

13. In a tire cording machine, a rotatable tire former of ring form, a ring-shaped cord-laying device through which the tire former projects, cord-engaging means on the tire former, means for oscillating the cord-laying device, and means responsive to movements of the cord-laying device for feeding the tire former therethrough.

14. A tire cording machine comprising a standard, a vertically adjustable former support on said standard, a ring-shaped former rotatable about the support, an annular row of pivoted cleats on said former and movable toward the center of said former when engaged by a cord, means for laying the cord back and forth over the former to engage the cleats, and means for twisting said cord during the weaving operation.

The foregoing specification signed at Washington, District of Columbia, this 4th day of November, 1916.

WALTER KLINE.